(12) United States Patent
Marriott et al.

(10) Patent No.: US 7,836,105 B2
(45) Date of Patent: Nov. 16, 2010

(54) CONVERTING FILE-SYSTEMS THAT ORGANIZE AND STORE DATA FOR COMPUTING SYSTEMS

(75) Inventors: Greg Marriott, Palo Alto, CA (US); David A. Shayer, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 260 days.

(21) Appl. No.: 11/274,083

(22) Filed: Nov. 14, 2005

(65) Prior Publication Data
US 2007/0112891 A1 May 17, 2007

(51) Int. Cl.
G06F 17/30 (2006.01)
(52) U.S. Cl. .................. 707/822; 707/609; 707/705; 711/1; 711/100; 386/131
(58) Field of Classification Search ............ 711/1–173
See application file for complete search history.

(56) References Cited

U.S. PATENT DOCUMENTS

| | | | | |
|---|---|---|---|---|
| 4,945,475 | A * | 7/1990 | Bruffey et al. .................. | 1/1 |
| 5,093,779 | A * | 3/1992 | Sakurai ............................ | 1/1 |
| 5,983,240 | A * | 11/1999 | Shoroff et al. .............. | 707/200 |
| 6,012,063 | A * | 1/2000 | Bodnar ....................... | 707/697 |
| 6,088,778 | A * | 7/2000 | Ruff et al. .................... | 711/173 |
| 6,185,666 | B1 * | 2/2001 | Murray et al. .............. | 711/173 |
| 6,313,386 | B1 * | 11/2001 | Capobianco et al. .......... | 84/600 |
| 6,377,958 | B1 * | 4/2002 | Orcutt ........................ | 707/200 |
| 6,502,101 | B1 * | 12/2002 | Verprauskus et al. ............... | 1/1 |
| 6,782,389 | B1 * | 8/2004 | Chrin et al. ................... | 707/10 |
| 6,804,746 | B2 * | 10/2004 | Duruoz ....................... | 711/112 |
| 6,871,245 | B2 * | 3/2005 | Bradley ....................... | 710/65 |
| 6,938,039 | B1 * | 8/2005 | Bober et al. .................. | 707/8 |

(Continued)

OTHER PUBLICATIONS

"Hierarchical File System," Wikipedia, the free encyclopedia, http://en.wikipedia.org/wiki/Hierarchical_File_System, 2 pages.

(Continued)

*Primary Examiner*—Tim T. Vo
*Assistant Examiner*—Michelle Owyang
(74) *Attorney, Agent, or Firm*—Beyer Law Group LLP

(57) ABSTRACT

Techniques for converting file-systems used for organizing and storing data on computer readable mediums are disclosed. A first file-system is converted to a second file-system while file(s) stored on the computer readable medium remain(s) virtually undisturbed in the same location. A FAT file-system (e.g., FAT32) is converted to an HFS file-system (e.g., HFS Plus) by generating HFS data structures (Catalog, Allocation File and Extents) for file(s) already stored in the HFS file-system. The number and location of the file(s) can be determined primarily based on the FAT file-system's data structures (FAT and Directory). The conversion process can be stopped before the FAT file-system indicators (partition map and boot sector) are overwritten. After the HFS data structured have been generated and successfully verified for the file(s) already stored on the computer readable medium, the HFS file-system can effectively replace the FAT file-system by modifying the partition map and writing a volume header that may overwrite that boot sector. Similarly, A HFS file-system can be converted to a FAT. In general, any file-system used to organize and store files can be converted based on the location of the files(s) which is typically readily obtainable from the original file-system.

27 Claims, 9 Drawing Sheets

U.S. PATENT DOCUMENTS

| | | | |
|---|---|---|---|
| 7,007,282 B1* | 2/2006 | Lee et al. | 719/321 |
| 7,043,477 B2* | 5/2006 | Mercer et al. | 1/1 |
| 7,054,888 B2* | 5/2006 | LaChapelle et al. | 707/104.1 |
| 7,130,867 B2* | 10/2006 | Luke | 707/200 |
| 7,345,234 B2* | 3/2008 | Plastina et al. | 84/615 |
| 7,401,104 B2* | 7/2008 | Shah et al. | 707/204 |
| 7,444,460 B2* | 10/2008 | Nakanishi et al. | 711/103 |
| 7,496,493 B1* | 2/2009 | Stevens | 703/24 |
| 7,751,628 B1* | 7/2010 | Reisman | 382/232 |
| 2003/0009473 A1* | 1/2003 | Ham et al. | 707/102 |
| 2003/0182139 A1* | 9/2003 | Harris et al. | 705/1 |
| 2004/0236798 A1* | 11/2004 | Srinivasan et al. | 707/200 |
| 2005/0050108 A1* | 3/2005 | Sawant et al. | 707/200 |
| 2005/0160223 A1* | 7/2005 | Chen et al. | 711/115 |
| 2005/0175317 A1* | 8/2005 | Chung et al. | 386/52 |
| 2005/0192974 A1* | 9/2005 | DeLorme et al. | 707/100 |
| 2006/0026283 A1* | 2/2006 | Trueba | 709/225 |

OTHER PUBLICATIONS

"Network File System," User's Guide documentation Artwork Refresh, http://www-1.ibm.com/servers/eserver/zseries/zos/nfs/nfsnew12.html, 1 page.

"Technical Note TN1150," HFS Plus Volume Format http://developer.apple.com/technotes/tn/tn1150.html, pp. 1-58.

"The HFS for Linus Page," http://www-sccm.stanford.edu/Students/hargrove/HFS/, 6 pages.

* cited by examiner

CONVERTING FILE-SYSTEMS THAT ORGANIZE AND STORE DATA FOR COMPUTING SYSTEMS

BACKGROUND OF THE INVENTION

A file management system (or "file-system") typically refers to the organizational structure used to order and track files. A file-system can be used by a computer program to access data typically arranged as various files in accordance with the file-system. Typically, the software that controls the allocation and usage of hardware resources ("Operating System") can access the file-system. As such, the operating system can be used, for example, by an application program to access files stored on a computer readable medium (e.g., hard disk)

A file-system also defines the way files are named and where they are placed logically for storage and retrieval. The DOS, Windows, OS/2, Macintosh, and UNIX-based operating systems all have file-systems in which files are placed somewhere in a logical hierarchical (tree) structure. A file is placed in a directory (or folder in Windows) or subdirectory at the desired place in the tree structure. File systems specify conventions for naming files. These conventions include the maximum number of characters in a name, which characters can be used, and, in some systems, how long the file name suffix can be. A file-system also includes a format for specifying the path to a file through the structure of directories.

File-systems that are predominantly in use today include the File Attribute Table (FAT) file-system (e.g., FAT32) typically used by Windows operating system and the Hierarchical File System (HFS) file-system typically used by Macintosh Operating Systems.

The FAT file-system is primarily known by the File Allocation Table (FAT) which it maintains as a map of the clusters (basic units of logical storage) that a file has been stored in. A new file is typically stored in one or more clusters which are not necessarily next to each other. A typical cluster size is 2,048 bytes, 4,096 bytes, or 8,192 bytes. The Windows operating system creates a FAT entry for the new file. This records where each cluster is located and their sequential order. When a file is read, the Windows operating system reassembles the file from the clusters and places it as an entire file where it can be read, for example, by an application program (a word processor) and displayed to a user. Until Windows 95 OSR2 (OEM Release 2), DOS and Windows file allocation table entries were 16 bits in length, limiting hard disk size to 128 megabytes, assuming a 2,048 size cluster. Up to 512 megabyte support is possible assuming a cluster size of 8,192 but at the cost of using clusters inefficiently. DOS 5.0 and later versions provide for support of hard disks up to two gigabytes with the 16-bit FAT entry limit by supporting separate FATs for up to four partitions. With 32-bit FAT entry (FAT32) support in Windows 95 OSR2, the largest size hard disk that can be supported is about two terabytes. However, personal computer users are more likely to take advantage of FAT32 with 5 or 10 gigabyte drives.

The HFS file-systems have similiar features and capabilities as the FAT file-systems. Apple Computers, Inc (or Apple) introduced HFS in 1985 as the new file system for Macintosh computers. It superseded the Macintosh File System (MFS) which was a flat file system, used only on the earliest Mac models. Because Macintosh computers typically use richer data than other commonly available file systems such as FAT used by DOS or the original Unix file system would allow, Apple developed a new more appropriate file system, rather than adopting an existing specification. For example, HFS permits filenames up to 31 characters in length, supports metadata and dual forked (separate data and resource forks per file) files. In 1998, Apple Computers introduced HFS Plus to make further enhancements including a more efficient allocation of disk space.

Typically, a computer readable medium (e.g., hard disk) is prepared for storing files by a process known as "formatting." Initially, the computer readable medium is formatted for a particular file system (e.g., FAT file system or HFS). However, this file-system can subsequently be converted to another file-system by a process known as re-formatting the disk or effectively formatting it for another file system. Prior to reformatting, any data on the computer readable medium can be stored temporary in another place. The stored data can then be copied back to the computer readable medium after it has been successfully re-formatted.

SUMMARY OF THE INVENTION

Broadly speaking, the invention pertains to techniques for converting file-systems used for organizing and storing data on computer readable mediums. In accordance with one aspect of the invention, a first file-system can be converted to a second file-system while one or more files stored on the computer readable medium remain virtually undisturbed in the same location. It will be appreciated that the second file-system can be generated primarily based on the location of the file(s) already stored on the computer readable medium. Thus, the file(s) can remain "in place" without being modified or rewritten. It will also be appreciated that there is no need for rewriting or storing the file(s) while the file-system is being converted. In one embodiment, a FAT file-system (e.g., FAT32) is converted to an HFS file-system (e.g., HFS Plus) by generating HFS data structures (Catalog, Allocation File and Extents) for file(s) already stored in the FAT file-system. The HFS data structures that are used to effectively implement a HFS file-system are primarily generated based on the number and location of the file(s). The number and location of the file(s) can be determined primarily based on the FAT file-system's data structures (FAT and Directory). It should be noted that the file-system conversion process can be stopped before the FAT file-system indicators (partition map and boot sector which identify the operating-system) are overwritten. After the HFS data structure have been generated and successfully verified for the file(s) already stored on the computer readable medium, the HFS file-system can effectively replace the FAT file-system by modifying the partition map and writing a volume header that may overwrite that boot sector). It will also be appreciated that a HFS file-system can be converted to a FAT file-system in accordance with one embodiment of the invention. In general, any file-system used to organize and store files can be converted using the invention as the invention utilizes the information about the organization of files provided by a first file-system to generate a second file-system.

In accordance with another aspect of the invention, a first file-system that is more likely to be used for a target environment can be used to initially format computer readable mediums (e.g., formatting hard disk at the factory). However, when the computer readable medium is to be used by a computer system that does not readily support (or prefer) the first file-system, conversion techniques of the invention can be used to convert the first file-system to another file-system (second file-system) used (or preferred) by the computer system. It will be appreciated that number of file-system conversions can be reduced while allowing interoperability between different computing systems that require various file-systems. Further, user experience is enhanced as the user can be prompted for a file-system conversion when a device (e.g., a media player) is connected to another device (e.g., a personal computer). The conversion can be initiated and/or controlled by an application program (e.g., iTunes application) running on a personal computer) which can also keep the user informed of the status of the conversion.

The invention can be implemented in numerous ways, including a method, an apparatus, a computer readable medium, a computer system. Several embodiments of the invention are discussed below.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

Figure 1A:
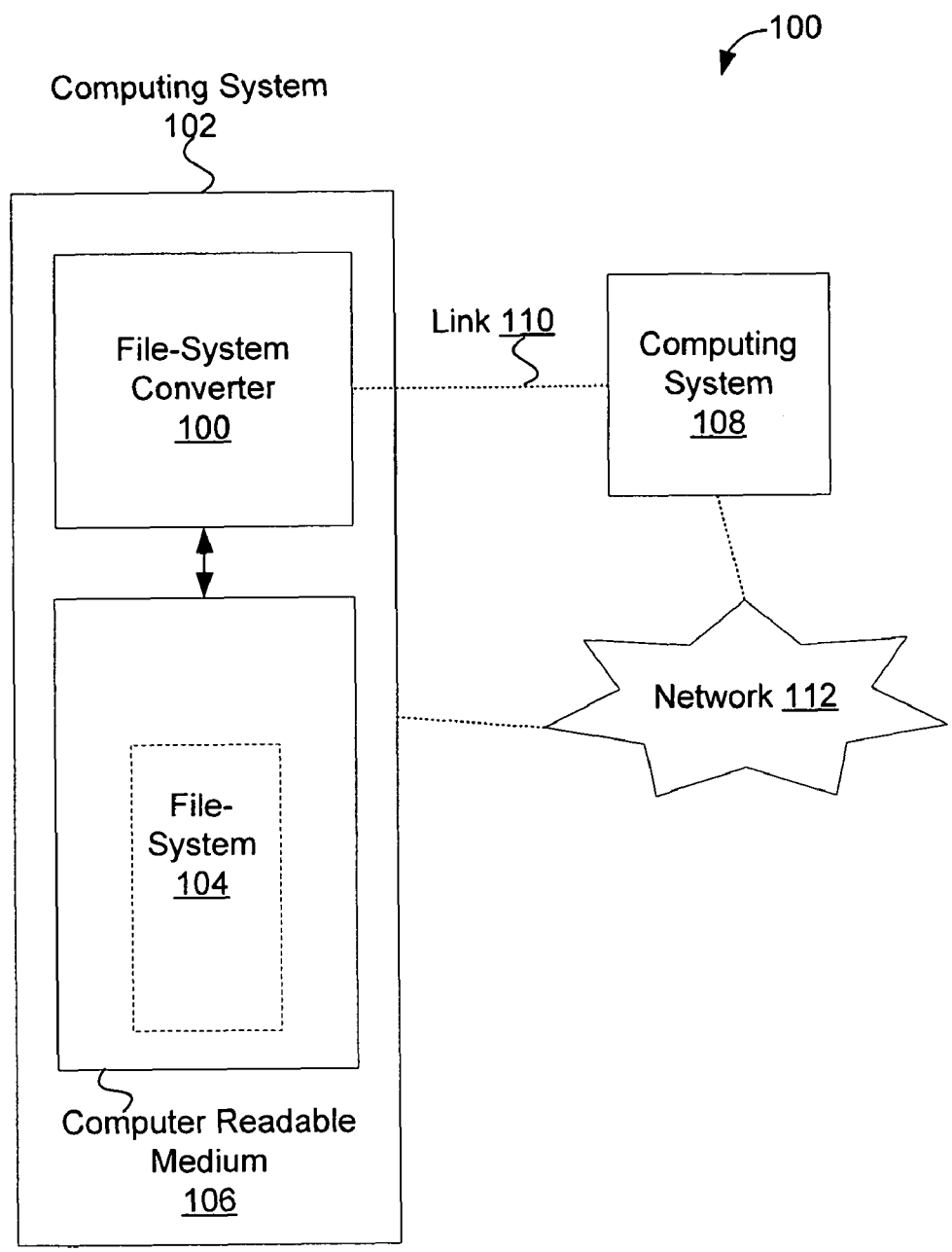
FIG. 1A depicts a file-system converter in a computing system in accordance with one embodiment of the invention.

As noted in the background of the invention, it is possible to reformat a computer readable medium that has been originally formatted for a particular file-system to effectively use another file-system. The reformatting process deletes the original file-system and any files it stores. Hence, before reformatting the computer readable medium, any files already stored on the computer readable medium can be temporarily stored and subsequently stored back on the computer readable medium after it has been successfully reformatted. As such, the conventional reformatting process typically requires a significant amount of temporary storage, processing power, and time for reading and writing the files back on the computer readable medium. Further, the same file can be rewritten to different location on the computer readable medium (i.e., moved) as the result of the conventional reformatting techniques. These effects and/or resources required for conventional reformatting may not be always provided or preferred. Furthermore, as the need or desire for interoperability between various computing platforms (hardware and operating systems) has greatly increased, alternative techniques for converting file-systems have become increasingly useful.

Accordingly, the invention pertains to techniques for converting file-systems used for organizing and storing data on computer readable mediums. In accordance with one aspect of the invention, a first file-system can be converted to a second file-system while one or more files stored on the computer readable medium remain virtually undisturbed in the same location. It will be appreciated that the second file-system can be generated primarily based on the location of the file(s) already stored on the computer readable medium. Thus, the file(s) can remain "in place" without being modified or rewritten. It will also be appreciated that there is no need for rewriting or storing the file(s) while the file-system is being converted. In one embodiment, a FAT file-system (e.g., FAT32) is converted to an HFS file-system (e.g., HFS Plus) by generating HFS data structures (Catalog, Allocation File and Extents) for file(s) already stored in the HFS file-system. The HFS data structures that are used to effectively implement a HFS file-system are primarily generated based on the number and location of the file(s). The number and location of the file(s) can be determined primarily based on the FAT file-system's data structures (FAT and Directory). It should be noted that the file-system conversion process can be stopped before the FAT file-system indicators (partition map and boot sector which identify the operating-system) are overwritten. After the HFS data structured have been generated and successfully verified for the file(s) already stored on the computer readable medium, the HFS file-system can effectively replace the FAT file-system by modifying the partition map and writing a volume header that may overwrite that boot sector). It will also be appreciated that a HFS file-system can be converted to a FAT file-system in accordance with one embodiment of the invention. In general, any file-system used to organize and store files can be converted using the invention as the invention utilizes the information about the organization of files provided by a first file-system to generate a second file-system.

In accordance with another aspect of the invention, a first file-system that is more likely to be used for a target environment can be used to initially format computer readable mediums (e.g., formatting hard disk at the factory). However, when the computer readable medium is to be used by a computer system that does not readily support (or prefer) the first file-system, conversion techniques of the invention can be used to convert the first file-system to another file-system (second file-system) used (or preferred) by the computer system. It will be appreciated that number of file-system conversions can be reduced while allowing interoperability between different computing systems that require various file-systems. Further, user experience is enhanced as the user can be prompted for a file-system conversion when a device (e.g., a media player) is connected to another device (e.g., a personal computer). The conversion can be initiated and/or controlled by an application program (e.g., iTunes application) running on a personal computer) which can also keep the user informed of the status of the conversion.

Embodiments of these aspects of the invention are discussed below with reference to FIGS. 1A-5. However, those skilled in the art will readily appreciate that the detailed description given herein with respect to these figures is for explanatory purposes as the invention extends beyond these limited embodiments.

FIG. 1A depicts a file-system converter 100 in a computing system 102 in accordance with one embodiment of the invention. As will be described below, the file-system converter 100 can convert a first file-system 104, used for organizing and storing files on a computer readable medium 106 (e.g., hard disk, primary or secondary memory) to a second file-system which can be different than the first file-system 104. It should be noted that the computing system 102 can, for example, be a personal computer (PC), a laptop computer, a wireless and/or handheld device (e.g., phone, media player). Typically, the computing system 102 can communicate with another computing system 108, for example, via a direct link 110 or a network 112.

Figure 1B:
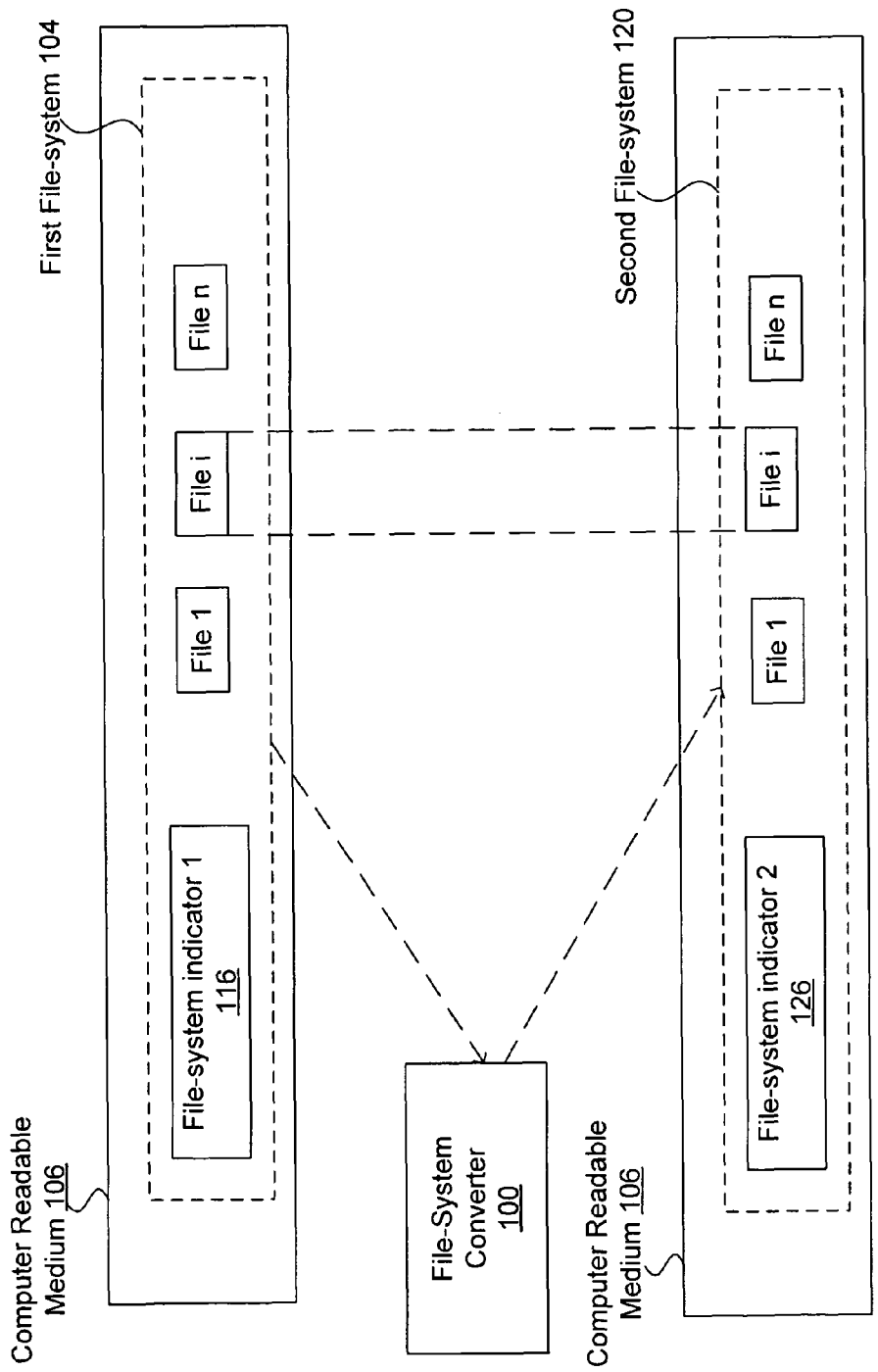
FIG. 1B depicts the conversion of a first file-system to another file-system in accordance with one embodiment of the invention.

FIG. 1B depicts conversion of the first file-system 104 to second file-system 120 in accordance with one embodiment of the invention. As shown in FIG. 1B, the file-system converter 100 can access the computer readable medium 106 (e.g., a disk) which stores a plurality of files ($F_1 \ldots F_n$). These files ($F_1 \ldots F_n$) are organized in accordance or in compliance with a first file-system (e.g., FAT, UFS). Typically, one or more file-system indicators (e.g., partition map, volume header) 116 and 126 are allocated on a designated portion of the computer readable medium 106 to identify the file-system.

In order to convert the first file-system 104, the file-system converter 100 initially determines the location of files ($F_1 \ldots F_n$). Again, it should be noted that these files are typically organized in accordance or in compliance with the first file-system 104 and stored on the computer readable medium 106. Hence, the location of files ($F_1 \ldots F_n$) can usually be determined based on the data structures (e.g., FAT and directory, HFS Attributes and catalog) that are stored in accordance or compliance with the first file-system 104. The location of these files can be determined by other means, for example, by reading the disk. In general, the location of the files ($F_1 \ldots F_n$) is determined.

It will be appreciated that based on the location of the files ($F_1 \ldots F_n$), a second file-system 120 can effectively be generated. The second file system 120 effectively replaces the first file-system 104. As will be discussed in greater detail, a second file-system 120 can, for example, be generated, for example, by creating the data structure(s) expected by the file-system. In other words, new data structures can be created that effectively replace those used by the first file-system 104.

Moreover, it will be appreciated that the location of a significant number of files ($F_1 \ldots F_n$) can remain the same on the computer readable medium 106 (at least one file ($F_i$) can remain the same). Furthermore, there is no need to rewrite or modify the file $F_i$. In other words, the file-system 104 can be converted to file-system 120 while at least $F_i$ remains "in place" and unchanged. It will be appreciated that typically a significant number of files ($F_1 \ldots F_n$) can remain in place. In some cases, the file-system converter 100 can generate the second file-system 120 while all of the files ($F_1 \ldots F_n$) remain in the same location and effectively unchanged. However, one or more file-system indicators 116 (e.g., Partition map, volume headers) are typically overwritten by one or more other file-system indicators 126 to indicate that the second file-system 120 is in use for storing files on the computer readable medium 106.

Figure 2:
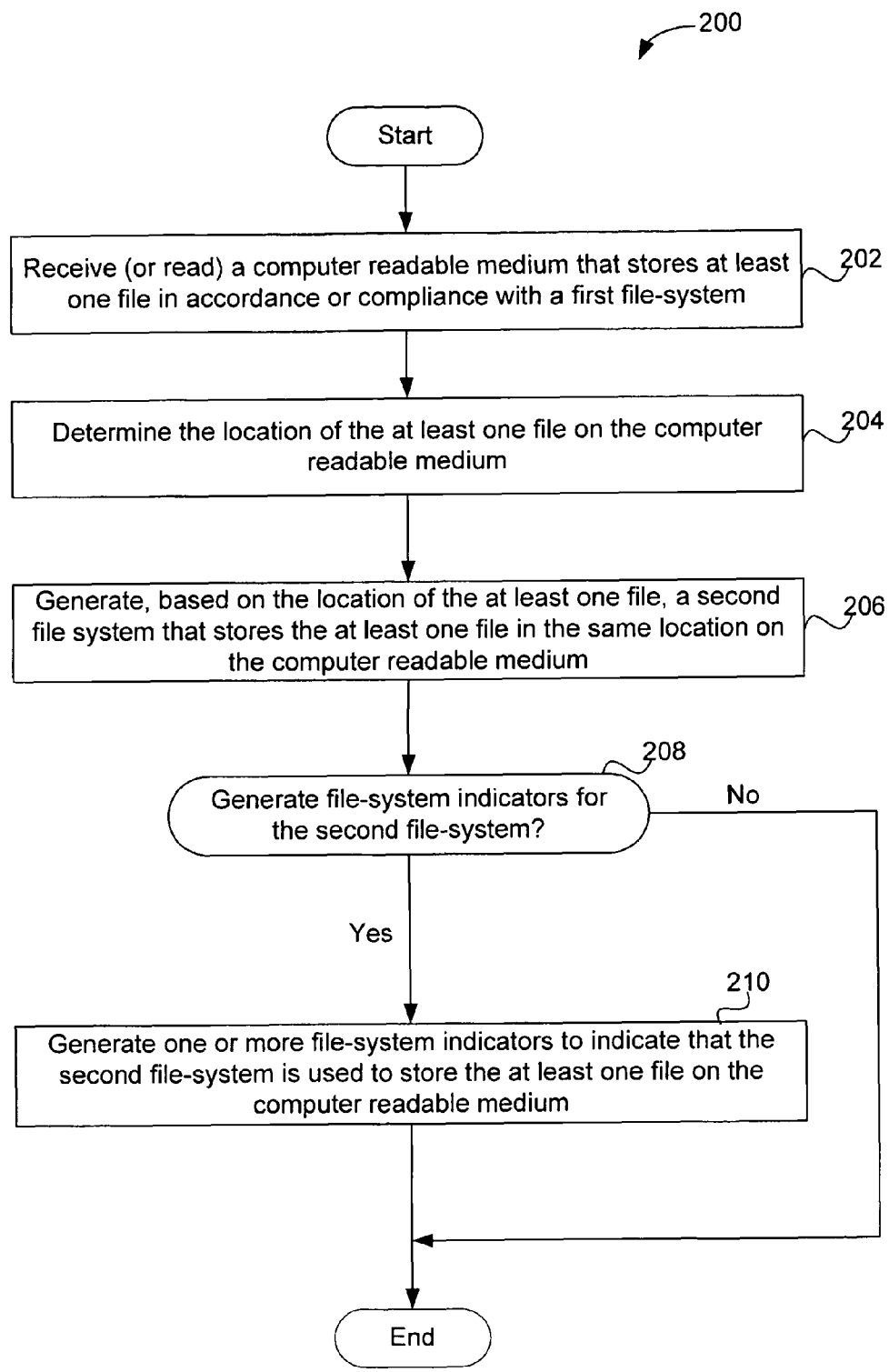
FIG. 2 depicts a conversion method for converting a first file-system in accordance with one embodiment of the invention to a second file-system.

FIG. 2 depicts a conversion method 200 for converting a first file-system in accordance with one embodiment of the invention to a second file-system. The conversion method 200 can, for example, be used by the file-system converter 100 (shown in FIG. 1A) to convert the first file-system 104 to the second file-system 120. Initially, a computer readable medium is received or read (202). Next, the location of the at least one file stored on the computer readable medium is determined (204). Thereafter, based on the location of the at least one file, a second file-system is generated (206). The second file-system stores the at least one file in the same location on the computer readable medium. As a result, the first file-system is effectively replaced by a second file-system, but the at least one file remains at the same location on the computer readable medium. It will also be appreciated that there is no need to alter or rewrite the at least one file as it can remain as is on the computer readable medium while the second file-system is generated and the first file-system is replaced. Typically, the first and second file-systems require one or more file-system indicators. Accordingly, it is determined (208) whether to generate one or more file-system indicators for the second file-system. If it is determined (208) not to generate one or more file-system indicators, the conversion method 200 ends. However, if it is determined (208) to generate one or more file-system indicators, one or more file system-indicators are generated (210) to indicate that the computer readable medium uses the second file-system to store the at least one file.

Figure 3A:
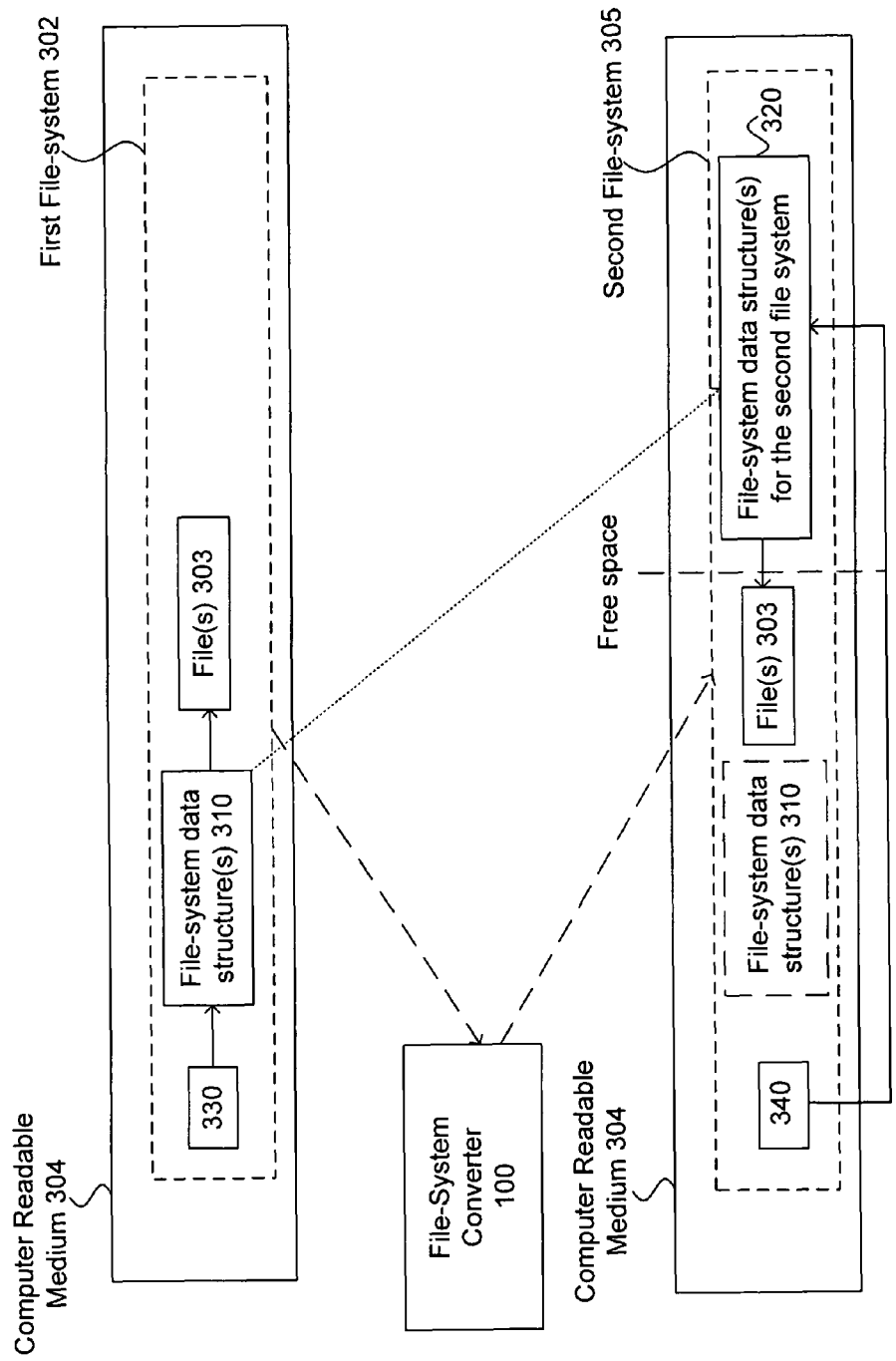
FIG. 3A depicts a file-system converter in accordance with another embodiment of the invention.

FIG. 3A depicts a file-system converter 100 in accordance with another embodiment of the invention. The file-system converter 100 converts a file-system 302, used for organizing one or more files 303 ($F_1 \ldots F_n$) stored on the computer readable medium 304, to a second file-system 306 that can be used to organize the same files ($F_1 \ldots F_n$). More particularly, the file-system converter 300 initially reads at least one data structure 310 of the first file-system 302. The data structure(s) 310 provides information about the files 303 ($F_1 \ldots F_n$) in accordance or compliance with the requirements of the first file-system 302. This information includes the number and location of file(s) 303 logically stored as the file-system 302. Those skilled in the art will appreciate that a file-system typically provides one or more data structure(s) (e.g., directory, FAT, catalog, table) that provide information about the files logically organized and stored in the file-system. The file-system converter 100 takes advantage of the information in the data structure(s) 310 to generate the second file-system 306. More particularly of files based on the location of the files 303 ($F_1 \ldots F_n$), the file-system converter 100 determines at least one other data structure 320 which can be used to effectively implement the second file-system 306. It should be noted that the at least one other data structure 320 provides information about the same files 303 ($F_1 \ldots F_n$) stored on the computer readable medium 304. The information provided by the data structure(s) 320 include(s) the location of the file(s) 303. Moreover, it is possible to keep the file(s) 303 at the same location and generate the file-system data structure(s) 320 for the second file-system on the computer readable medium 304. Hence, the location of the files ($F_1 \ldots F_n$) can remain the same even though the first file-system 302 is converted to the second file-system 306. Further, there is no need to rewrite or modify file(s) 303. As shown in FIG. 3A, the data structure(s) 320 can be stored in the free space available on the computer readable medium 304 without overwriting the data structure(s) 310. It should be noted that prior to storing the data structure(s) 320, it can be determined whether there is enough free space on the computer readable medium 304. Additionally, the data structure(s) 320 can be verified after it has been stored. When the data structure(s) 320 has been successfully verified, one or more file-system indicators 330 can be overwritten by one or more file-system indicators 340 to indicate that the second file-system 306 is in use. The first file-system 302 is effectively converted to the second file-system 306 even though one or more data structure(s) 320 may still be stored on the computer readable medium 304.

The process of conversion may be terminated before the file-system indicator 330 is overwritten. Thus, it is possible to recover the first file-system 302 if there is a need (e.g., not enough space, verification fails).

Figure 3B:
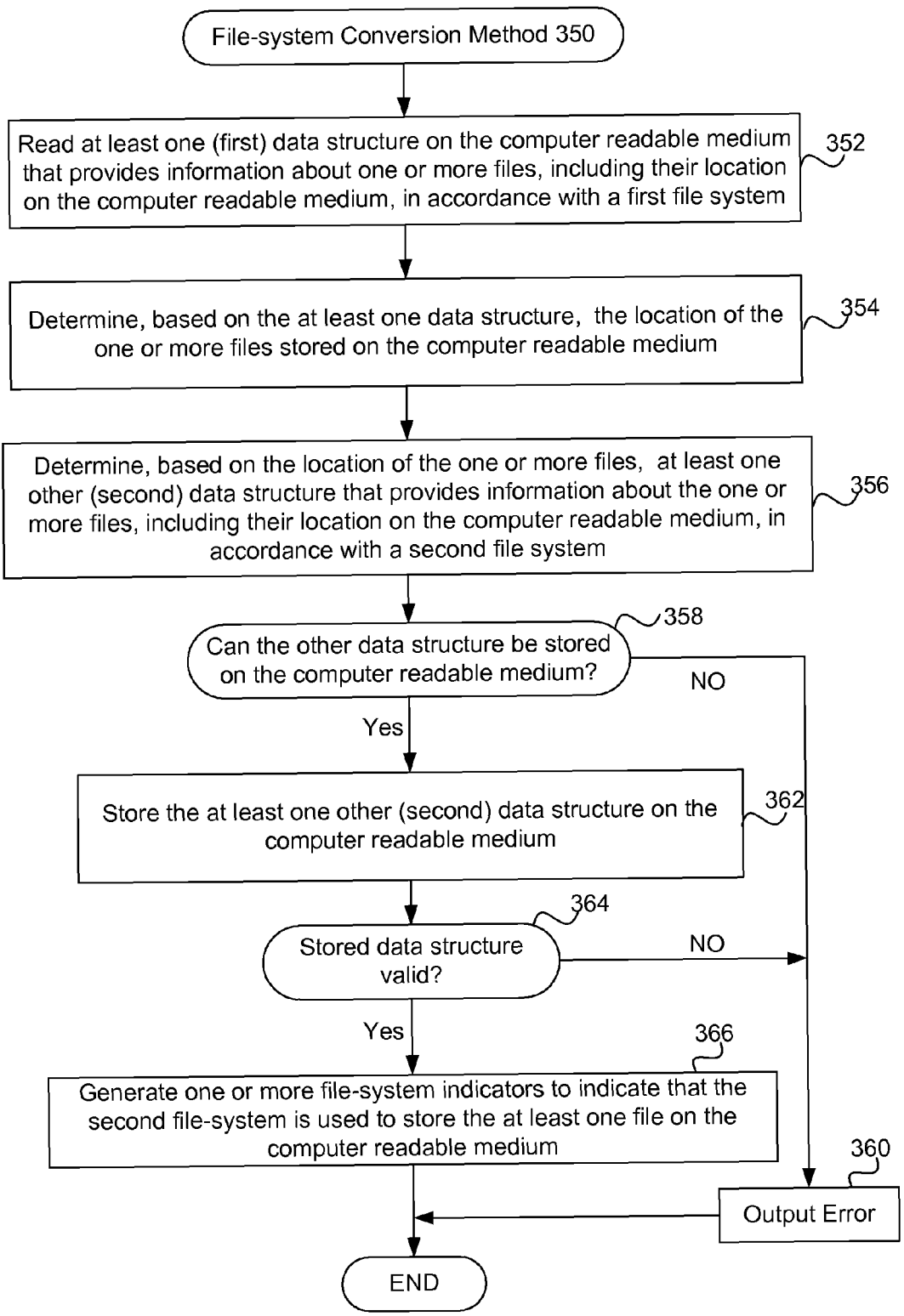
FIG. 3B depicts a conversion method for converting a first file-system, used to organize files stored on a computer readable medium, to a second file-system which can be used to store the same files in the same location on the computer readable medium in accordance with one embodiment of the invention.

FIG. 3B depicts a conversion method 350 for converting a first file-system, used to organize files stored on a computer readable medium, to a second file-system which can be used to store the same files in the same location on the computer readable medium in accordance with one embodiment of the invention. Initially, at least one (first) data structure of a first file-system is read (352). The (first) data structure(s) provide(s) information about the file(s) stored on the computer readable medium. This information includes the location of files stored on the computer readable medium. Those skilled in the art will appreciate that a file-system typically provides one or more data structures (e.g., directory, FAT, catalog, table) that describe the number and location of files which the file-system stores. Accordingly, based on the data structure(s), the location of the file(s) stored on the computer readable medium is determined (354). Subsequently, based on the location of the file(s), at least one other (second) data structure is determined (356). This other (second) data structure(s) provide(s) information about the same files as originally stored on the computer readable medium (i.e., in the same location). Thereafter, it is determined (358) whether the other (second) data structure(s) can be stored on the computer readable medium and an error can be output (360) and subsequently, the conversion method 350 can end accordingly.

However, if it is determined (358) that the other (second) data structure(s) can be stored on the computer readable medium, the data structure(s) are stored (362) on the computer readable medium and subsequently validated (364). If the other (second) data structure is not successfully verified, an error is output (360), and the conversion method 250 ends accordingly. However, if the other data structure(s) can be successfully verified (364), one or more file-system indicators (e.g., partition maps, boot sector, volume headers) are generated (e.g., overwritten) (366) on the computer readable medium to indicate that the second file-system is being used to organize data on the computer readable medium and the other (second) data structure(s) should be used to locate data stored in accordance with the second file-system. As a result, the first file-system is effectively converted to the second file-system and the conversion method 350 ends.

Figure 4A:
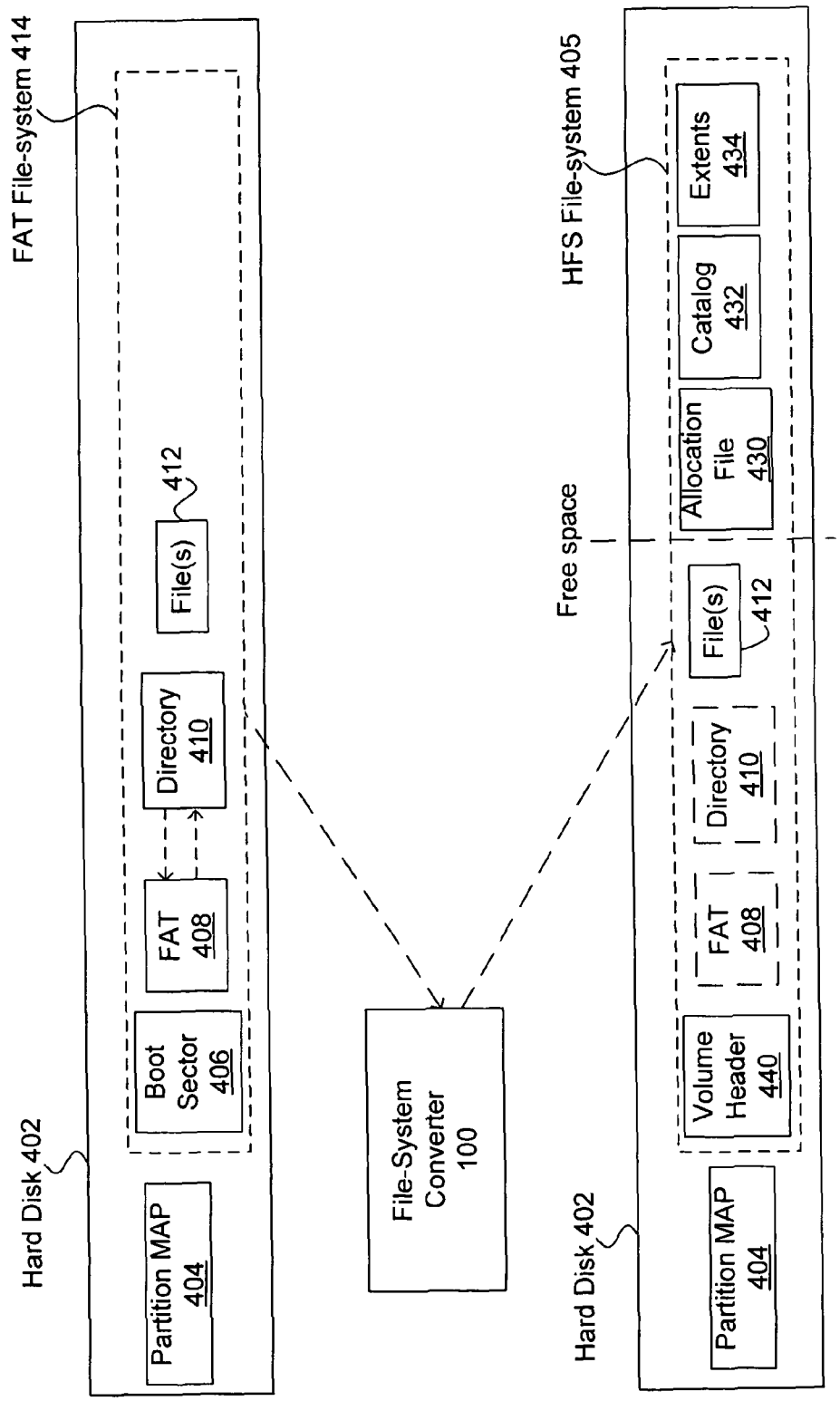
FIG. 4A illustrates conversion of a hard disk from a FAT file-system generally used as the file-system in the IBM/PC computing environment to a HFS file-system generally used in the Apple/PC computing environment.
Figure 4B:
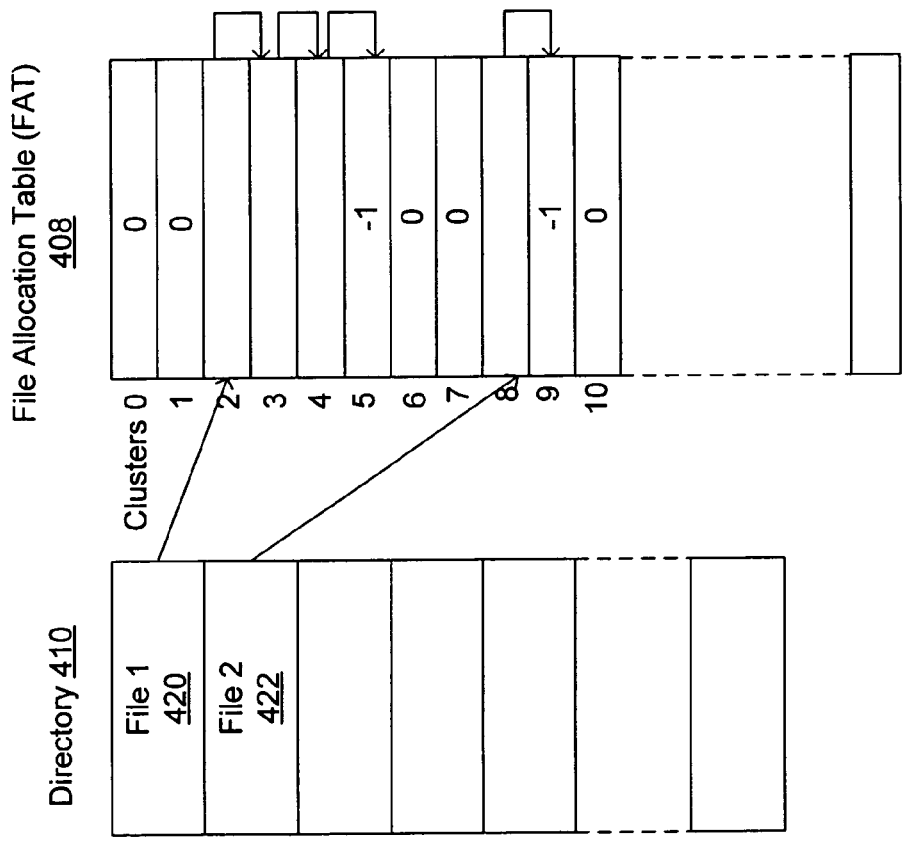
FIG. 4B depicts a simplified FAT and directory.
Figure 4C:
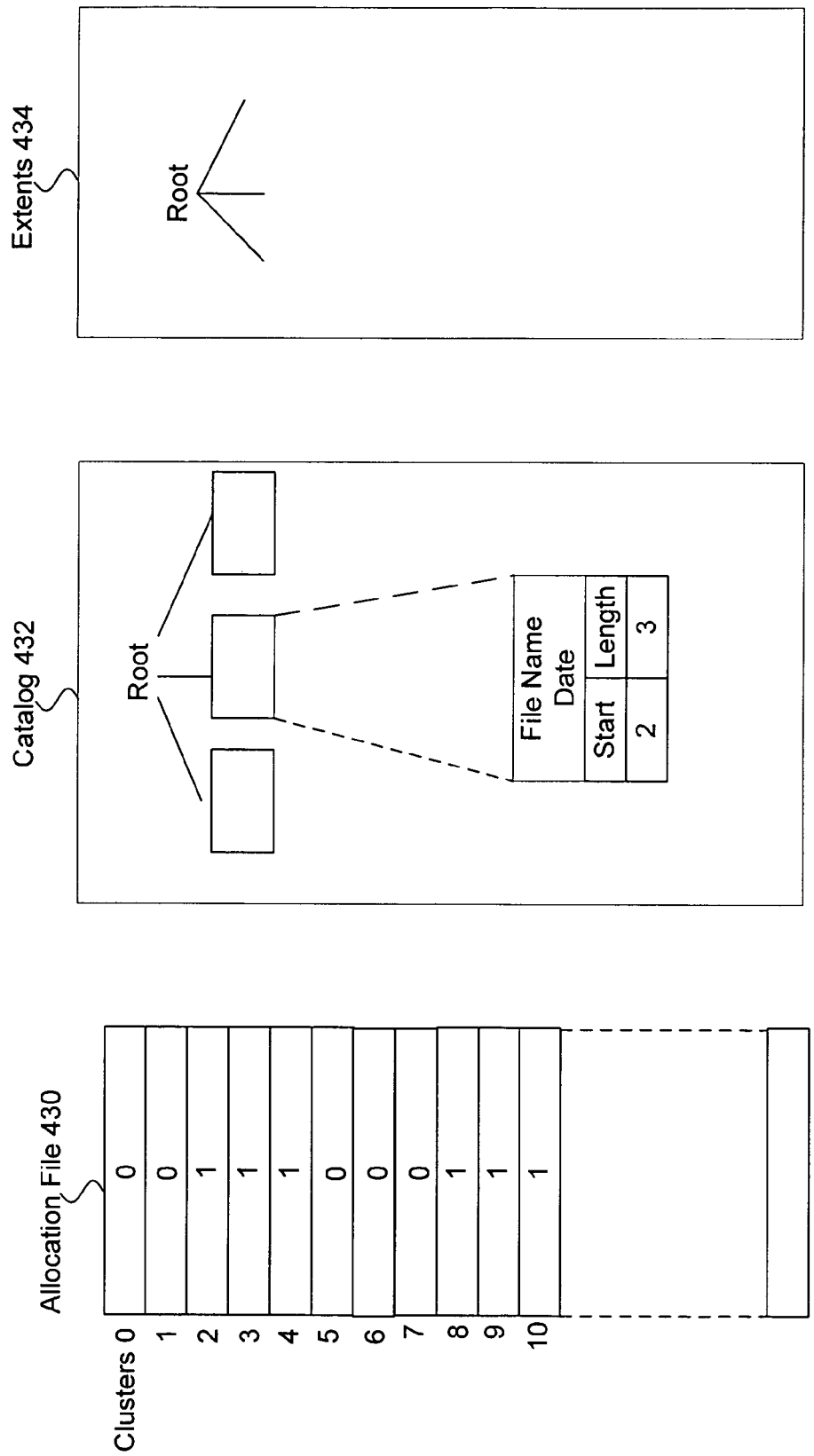
FIG. 4C illustrates a simplified allocation file, catalog and extents.

FIG. 4A illustrates conversion of a hard disk 402 from a FAT file-system 404 for Window Operating System generally in the IBM/PC computing environment to a HFS file-system 405 for Macintosh Operating System generally used in the Apple/PC computing environment. As shown in FIG. 4A, the hard disk 402 includes a partition MAP 404 and various other components that may collectively represent a FAT file-system 414. The components that make the FAT file-system 414 include a boot sector 406, a FAT 408, a directory 410, and one or more files 412 which can also be considered to be part of the FAT file-system 414. Those skilled in the art will appreciate that the FAT 408 and directory 410 can be used to determine the location of the files stored (or allocated) on the hard disk 402. Referring now to FIG. 4B, a simplified FAT 408 and directory 410 are depicted. As shown in FIG. 4B, a file 420 in the directory 410 is allocated in clusters 2, 3 and 4, file 422 is allocated in clusters 8 and 9, and so on. Therefore, the FAT 408 and directory 410 can be read to determine the number and location of files stored on the hard disk depicted in FIG. 4A. Subsequently, based primarily on the number and location of the files, the size of data structures needed to implement a HFS file-system can be determined. Assuming there is enough free space on the hard disk 402 for these HFS data structures, an allocation file 430, a catalog 432, and extents 434 can be allocated on the hard disk 402. FIG. 4C illustrates a simplified allocation file 430, catalog 432 and extents 434. Those skilled in the art will appreciate that based primarily on the FAT 408 and directory 410 (shown in FIG. 4A), the allocation file 430, catalog 432 and extents 434 can be generated to refer to the same files 412 ($F_1 \ldots F_n$) which now can be stored in accordance or compliance with the requirements of a HFS system.

After the information relating to the files 412 ($F_1 \ldots F_n$) has been effectively transferred to the allocation file 430, catalog 432, and possibly extents 434, this information can be verified to ensure that files 412 ($F_1 \ldots F_n$) are listed in the same location on the hard disk 402. It will be appreciated that it is possible to effectively stop the conversion of the FAT file-system 414 as long as the partition MAP 404 and/or boot sector 406 have not been modified to indicate that a HFS file-system is in use. Therefore, it is possible to effectively stop the conversion process and effectively leave the FAT file-system 414 and file(s) 412 as they were before the conversion process was initiated. If the HFS data structures are successfully verified, the partition MAP 404 can be modified and a volume header 440 can replace the boot sector 406 to effectively convert the FAT file-system 414 to a HFS file-system 405.

Based on the foregoing, those skilled in the art will also know that a HFS file-system can be converted to a FAT file-system in a similar manner as discussed above. As such, it is possible to convert HFS data structures to FAT data structures that list the files in the same location on the hard disk 402. However, the boot sector 406 and FAT 408 may be overwritten by the allocation file, catalog and extents data structure, if a HFS file-system requires storing these structures at the beginning of the file-system. Those skilled in the art will also appreciate that HFS file extension may also be stored as resource files (e.g., as a "._File") that can subsequently be used, for example, by an Apple-Double extension that may recognize and allow use of meta data and extended information even though a FAT file-system is used. Those skilled in the art will also appreciate that if a FAT and HFS file-system use different cluster sizes, offset numbers can be adjusted in order to make the conversion.

In accordance with one embodiment of the invention, utilities conventionally used to allocate and write information (e.g., system utilities) can be used or modified to convert a FAT file-system or a HFS file-system. The utilities normally used can be modified to determine the size of data and the location of free space without actually writing data. Further, a conventional system utility can be modified to write data at a desired location, for example, by accepting the location as a parameter. Therefore, it is possible to use and modify the utilities readily available to efficiently implement the invention.

Figure 5:
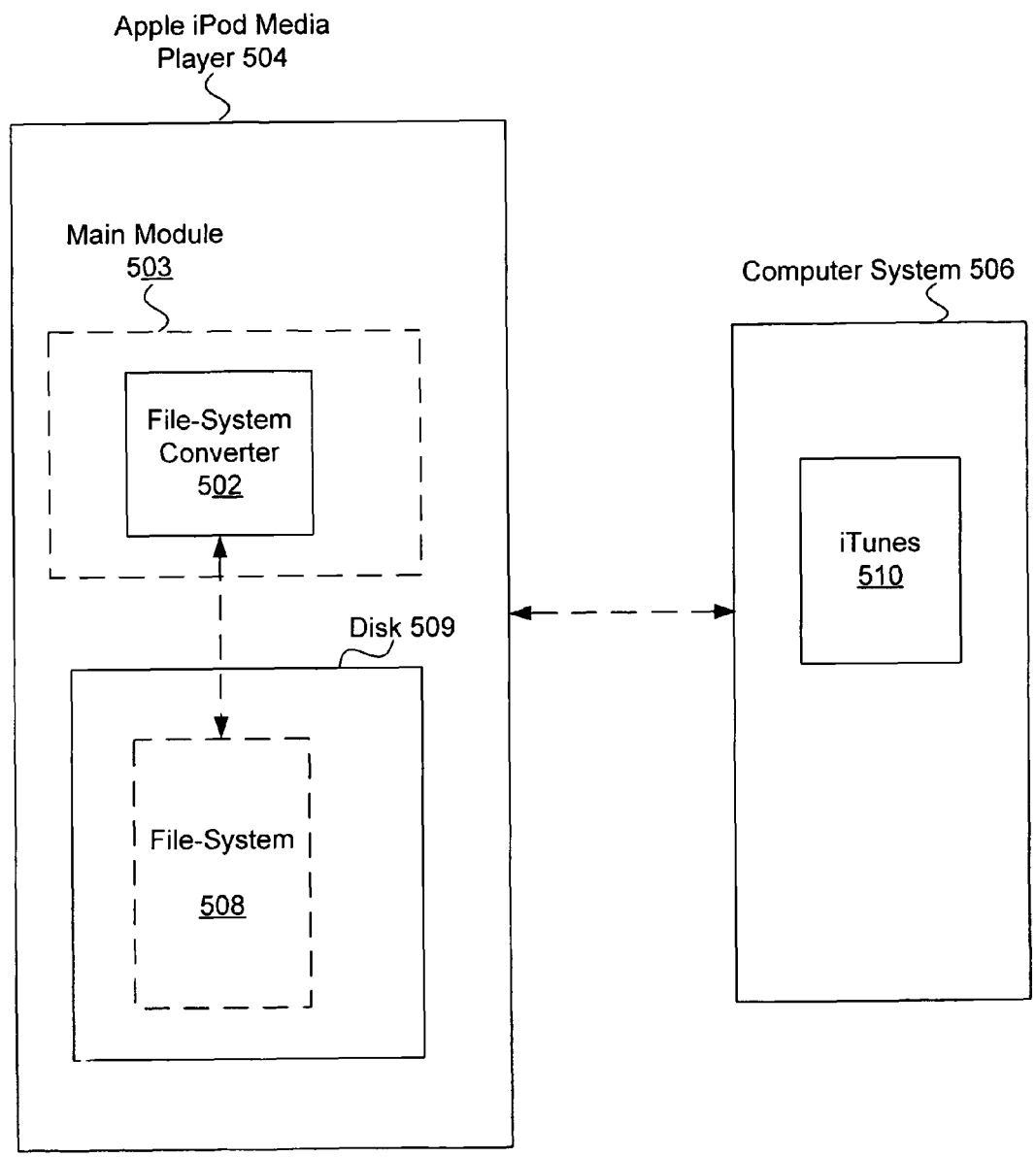
FIG. 5 depicts a file-system converter in an Apple iPod media player in accordance with one embodiment of the invention.

FIG. 5 depicts a file-system converter 502 provided for an Apple iPod media player 504 in accordance with one embodiment of the invention. As shown in FIG. 5, the file-system converter 502 is implemented as a part of a main application module 503, and the iPod 504 may be connected to a computer system 506 (e.g., an IBM PC, an Apple PC). As a part of the main application module 503, the file-system converter 502 can directly access the file-system 508 and additionally have access to memory manager(s) utilities, and drivers (not shown). An iTunes application 510 on the computer system 506 can facilitate the conversion of the file-system used to store files on the disk 509. The iTunes 510 can, for example, prompt the user of the Apple iPod whether to convert the file-system. The user can, for example, be prompted when the file-system 508 used by the iPod is unlikely to be used, supported or preferred by the computer system 506. Thus, the disk 509 can be initially formatted (typically at the factory) in a first file-system which is the most likely to be used by most computing systems and a number of files can be added to it (e.g., disks can be formatted to use FAT 32 file-system used predominantly today).

However, when the formatted disk is connected to a computer system (e.g., Apple PC) that does not typically readily support the first file-system (e.g., FAT32), the iTune 510 can automatically prompt the user whether a file conversion is desired. As such, the file-system can be converted to another file-system (e.g., HFS) and the files already on the disk 509 can be preserved. Moreover, at least a significant number of files can remain in the same location as originally formatted on the disk 509. Typically, most files can remain in the same location because usually a disk which has been formatted in the factory has a relatively large amount of free space available (i.e., files stored on the disk take up a relatively small amount of disk space).

It will be appreciated that the iTunes 510 can control the file-system conversion performed by the file-system converter 502, or an "updater" application can be launched to effectively control the conversion. In any case, from the perspective of the file-system converter 502, the application that effectively controls the conversion can behave as a "host" application. The "host" application can control the conversion, for example, by sending a command to iPod to initiate the conversion of the disk 509, poll the iPod to display a progress bar, and display success or failure messages and other information (e.g., "don't disconnect") on the computer system 506. If the conversion is successfully completed, the iPod can be rebooted.

The many features and advantages of the present invention are apparent from the written description, and thus, it is intended by the appended claims to cover all such features and advantages of the invention. Further, since numerous modifications and changes will readily occur to those skilled.

What is claimed is:

1. A method comprising:
   reading a first catalog from a catalog-based file system on a storage device, wherein the first catalog includes a b-tree representation of a hierarchy of content files on the storage device;
   parsing the first catalog to reveal first location information regarding content files on the storage device and extended metadata information regarding the content files;
   creating, using the first location information, a flat table on the storage device, the flat table compatible with a flat table-based file system;
   creating one or more resource files on the storage device, the one or more resource files compatible with the flat table-based file system and containing the extended metadata information;
   parsing the flat table to reveal second location information regarding content files stored in the flat table-based file system;
   creating a second catalog on the storage device using the second location information, wherein the second catalog includes a b-tree representation of a hierarchy of content files on the storage device; and
   adding the extended metadata from the one or more resource files to the second catalog.

2. The method of claim 1, wherein the flat table-based file system utilizes a file allocation table.

3. The method of claim 1, further comprising:
   overwriting a volume header on the storage device with a boot sector, wherein the boot sector indicates that the flat table-based file system should be utilized for the storage device.

4. The method of claim 1, wherein the resource files are used as a source of metadata and extended information by an operating system running the flat-table file system.

5. A method comprising:
   detecting, at a computer system, presence of a portable media device having a first file system, wherein the second file system contains content file location information in a first flat table;
   creating a b-tree containing location information regarding content file location on the portable media device;
   storing the created b-tree on the portable media device;
   altering one or more file system indicators on the portable media device to access the b-tree as opposed to the first flat table;
   parsing the b-tree to reveal location information regarding content files stored in the first file system and extended metadata information regarding the content files;
   creating, using the location information regarding content files stored in the first file system, a second flat table on the storage device, the second flat table compatible with a flat table-based file system;
   creating one or more resource files on the storage device, the one or more resource files compatible with the flat table-based file system and containing the extended metadata information; and
   altering one or more file system indicators on the portable media device to access the second flat table as opposed to the b-tree.

6. The method of claim 5, wherein the second file system is a file allocation table (FAT) file system.

7. The method of claim 6, wherein the first file system is a Hierarchical File System (HFS).

8. The method of claim 5, further comprising, in response to the detecting, providing a prompt allowing for a selection of whether or not to convert the first file system on the portable media device to the second file system.

9. The method of claim 8, wherein the detecting and the providing are performed by an application program running on the computer system.

10. The method of claim 9, wherein the application program further issues status updates as to the status of the conversion during the creating, storing, and altering.

11. The method of claim 9, wherein the application program is a media management application.

12. The method of claim 5, further comprising:
   prior to the altering, performing a validity check on the b-tree; and
   aborting the altering if the validity check fails.

13. A computer system comprising:
   an interface to a portable media device, wherein the portable media device contains a plurality of content files;
   a media management application;
   a catalog-based file system; and
   a processor configured to run the media management application, wherein the media management application is designed to:
      detect the presence of a flat table-based file system on the portable media device, wherein the flat table-based file system stores content file location information in a first flat table;
      create a b-tree containing location information regarding content file location on the portable media device;

store the created b-tree on the portable media device; and alter one or more file system indicators on the portable media device to access the b-tree as opposed to the first flat table;

parse the b-tree to reveal location information regarding content files stored in the first file system and extended metadata information regarding the content files;

create, using the location information regarding content files stored in the first file system, a second flat table on the storage device, the second flat table compatible with a flat table-based file system;

create one or more resource files on the storage device, the one or more resource files compatible with the flat table-based file system and containing the extended metadata information; and alter one or more file system indicators on the portable media device to access the second flat table as opposed to the b-tree.

14. The computer system of claim 13, wherein the portable media device contains one or more resource files containing metadata regarding the content files stored on the portable media device, and therein the media management application is further designed to:

retrieve the resource files; and incorporate information in the resource files into the b-tree.

15. The computer system of claim 13, wherein the creating of a b-tree includes examining locations of all content files on the portable media device.

16. The computer system of claim 13, wherein the creating of a b-tree includes retrieving location information regarding content file location on the portable media device from the flat table on the portable media device.

17. A system comprising:

a portable media device including:

a storage device storing a plurality of content files;

a playback module; and a flat table-based file system, wherein the flat table-based file system stores location information regarding the content file locations in a first flat table in the storage device; and a computer including:

an interface to the portable media device;

a media management application;

a catalog-based file system; and a processor configured to run the media management application, wherein the media management application is designed to:

create a b-tree containing location information regarding content file location on the portable media device;

store the created b-tree on the portable media device; and alter one or more file system indicators on the portable media device to access the b-tree as opposed to the first flat table; and parse the b-tree to reveal location information regarding content files stored in the first file system and extended metadata information regarding the content files;

create, using the location information regarding content files stored in the first file system, a second flat table on the storage device, the second flat table compatible with a flat table-based file system;

create one or more resource files on the storage device, the one or more resource files compatible with the flat table-based file system and containing the extended metadata information; and alter one or more file system indicators on the portable media device to access the second flat table as opposed to the b-tree.

18. The system of claim 17, wherein the interface is a wired interface.

19. The system of claim 17, wherein the interface is a wireless interface.

20. The system of claim 17, wherein the media management application is further designed to leave the flat table on the portable media device after the one or more file system indicators have been altered to access the b-tree.

21. Computer readable medium for storing in tangible form computer instructions executable by a processor for modifying an operation of a device, the device having a processor, the computer readable medium comprising:

computer code for reading a first catalog from a catalog-based file system on a storage device, wherein the first catalog includes a b-tree representation of a hierarchy of content files on the storage device;

computer code for parsing the first catalog to reveal first location information regarding content files on the storage device and extended metadata information regarding the content files;

computer code for creating, using the first location information, a flat table on the storage device, the flat table compatible with a flat table-based file system;

computer code for creating one or more resource files on the storage device, the one or more resource files compatible with the flat table-based file system and containing the extended metadata information;

computer code for parsing the flat table to reveal second location information regarding content files stored on the storage device;

computer code for retrieving resource files on the storage device, wherein the resource files contain metadata regarding the content files; and computer code for creating, using the second location information, a second catalog on the storage device, the second catalog compatible with a catalog-based file system and including a b-tree representation of a hierarchy of content files on the storage device.

22. The computer readable medium of claim 21, further comprising:

computer code for alter one or more file system indicators on the storage device to access the catalog as opposed to the flat table.

23. The computer readable medium of claim 21, wherein the resource files include metadata previously contained in a b-tree.

24. A method for converting a file system on a portable media device from a Hierarchical File System (HFS) file system to a file allocation table (FAT) file system, wherein the method comprises:

receiving a command to convert the HFS file system to a FAT file system;

reading a first HFS catalog, in a b-tree format, from a storage on the portable media device, wherein the first HFS catalog contains location information regarding content files stored on the portable media device, ordinary metadata relating to the files stored on the portable media device, and extended metadata relating to the files stored on the portable media device, wherein the extended metadata includes information about the type of file and a creator of the file;

parsing the first HFS catalog to reveal the extended metadata information regarding the content files;

creating, using the location information, a FAT flat table on the storage device, the FAT flat table compatible with a flat table-based file system; and creating one or more resource files on the storage device, the one or more resource files compatible with the FAT file system and containing the extended metadata information, wherein the resource files are used by the FAT file system;

receiving a command to covert the FAT file system on the portable media device back to an HFS file system;

parsing the FAT flat table to reveal the location information;

creating a second HFS catalog on the portable media device using the location information; and adding the extended metadata from the one or more resource files to the second HFS catalog.

25. The method of claim 24, wherein the creating a second HFS catalog includes using ordinary metadata stored in the FAT flat table to create the second HFS catalog.

26. The method of claim 24, further comprising:
performing a validity check on the b-tree; and
aborting the altering if the validity check fails.

27. The method of claim 24, wherein the method does not alter location or content of media files stored on the portable media device.

* * * * *

UNITED STATES PATENT AND TRADEMARK OFFICE
CERTIFICATE OF CORRECTION

| | | |
|---|---|---|
| PATENT NO. | : 7,836,105 B2 | Page 1 of 1 |
| APPLICATION NO. | : 11/274083 | |
| DATED | : November 16, 2010 | |
| INVENTOR(S) | : Greg Marriott et al. | |

It is certified that error appears in the above-identified patent and that said Letters Patent is hereby corrected as shown below:

On the title page, item (57), in column 2, in "Abstract", line 18, delete "A HFS" and insert -- an HFS --, therefor.

On the title page, item (57), in column 2, in "Abstract", line 21, delete "files(s)" and insert -- file(s) --, therefor.

In column 1, line 16, after "disk)" insert -- . --.

In column 10, line 11, in claim 5, after "system," insert -- wherein the computer system has a second file system, --.

In column 13, line 11, in claim 24, delete "covert" and insert -- convert --, therefor.

Signed and Sealed this
Fifteenth Day of November, 2011

David J. Kappos
*Director of the United States Patent and Trademark Office*